US012753781B2

(12) United States Patent
Kreutmayr et al.

(10) Patent No.: US 12,753,781 B2
(45) Date of Patent: *Oct. 6, 2026

(54) ELECTROHYDRAULIC CONTROL DEVICE AND ADJUSTABLE HYDRAULIC PUMP SYSTEM

(71) Applicant: HAWE Hydraulik SE, Aschheim (DE)

(72) Inventors: Fabian Kreutmayr, Aschheim (DE); Andreas Jell, Aschheim (DE); Markus Imlauer, Aschheim (DE)

(73) Assignee: HAWE Hydraulik SE, Aschheim (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/909,215

(22) Filed: Oct. 8, 2024

(65) Prior Publication Data

US 2025/0027515 A1 Jan. 23, 2025

Related U.S. Application Data

(63) Continuation of application No. 18/177,195, filed on Mar. 2, 2023, now Pat. No. 12,140,164.

(30) Foreign Application Priority Data

Mar. 7, 2022 (DE) .................... 10 2022 202 279.3

(51) Int. Cl.
*F15B 11/16* (2006.01)
*F04B 1/295* (2020.01)
(Continued)

(52) U.S. Cl.
CPC .......... *F15B 11/165* (2013.01); *F04B 49/002* (2013.01); *F04B 49/06* (2013.01);
(Continued)

(58) Field of Classification Search
CPC ........ F04B 1/295; F04B 1/324; F04B 49/002; F04B 49/06; F04B 49/08; F15B 11/165; F15B 2211/20553
See application file for complete search history.

(56) References Cited

U.S. PATENT DOCUMENTS 6,308,516 B1 10/2001 Kamada
11,052,881 B1 7/2021 Chen
(Continued)

FOREIGN PATENT DOCUMENTS

CN 106019947 A 10/2016
DE 10 2017 217 621 B4 12/2020
(Continued)

OTHER PUBLICATIONS

Examination Report for German Application No. 110 2022 202 279.3, dated Nov. 23, 2022, 6 pages.
(Continued)

*Primary Examiner* — Matthew Wiblin
(74) *Attorney, Agent, or Firm* — DINSMORE & SHOHL LLP

(57) ABSTRACT

An electrohydraulic control device for an adjustable hydraulic pump system includes a valve device, an electronic control unit and a first fluid sensor. The valve device includes a pressure inlet, a tank outlet and a first electromagnetically actuated valve. An outlet pressure of the first adjustable hydraulic pump system is applied to the pressure inlet. The first fluid sensor detects an actual value of a fluid parameter of the first adjustable hydraulic pump system and transmits it to the electronic control unit. The electronic control unit includes computer-based modeling of the dynamics of the first adjustable hydraulic pump system, and
(Continued)

actuates the first electromagnetically actuated valve based on the actual value of the fluid parameter and the computer-based modeling.

11 Claims, 4 Drawing Sheets

(51) Int. Cl.

| | |
|---|---|
| ***F04B 1/324*** | (2020.01) |
| ***F04B 49/00*** | (2006.01) |
| ***F04B 49/06*** | (2006.01) |
| ***F04B 49/08*** | (2006.01) |

(52) U.S. Cl.
CPC .............. *F04B 49/08* (2013.01); *F04B 1/295* (2013.01); *F04B 1/324* (2013.01); *F15B 2211/20553* (2013.01)

(56) References Cited

U.S. PATENT DOCUMENTS

| | | | |
|---|---|---|---|
| 2012/0233996 | A1 | 9/2012 | Quinnell |
| 2019/0353156 | A1 | 11/2019 | Ward |
| 2021/0025374 | A1 | 1/2021 | Muehlbauer |
| 2021/0123540 | A1 | 4/2021 | Gruber |
| 2021/0227627 | A1 | 7/2021 | Kirch |
| 2021/0405666 | A1 | 12/2021 | Stutes |
| 2022/0091188 | A1 | 3/2022 | Huang |
| 2023/0068920 | A1 | 3/2023 | Velde |

FOREIGN PATENT DOCUMENTS

| | | | |
|---|---|---|---|
| DE | 10 2019 220 501 | A1 | 6/2021 |
| EP | 2664804 | A2 | 11/2013 |
| EP | 3 770 431 | B1 | 5/2022 |
| WO | 2021193839 | A1 | 9/2021 |

OTHER PUBLICATIONS

Hartig, J.; Schanzle, C.; Pelz, P.: Validation Of A Soft Sensor Network for Condition Monitoring in Hydraulic Systems, Group 6, Predictive maintenance, Paper 6-1, 12th International Fluid Power Conference, Dresden 2020, 167-173, 7 pages.

ELECTROHYDRAULIC CONTROL DEVICE AND ADJUSTABLE HYDRAULIC PUMP SYSTEM

CROSS REFERENCE TO RELATED APPLICATIONS

This application is a continuation of U.S. application Ser. No. 18/177,195, filed Mar. 2, 2023, which claims priority to German Application 10 2022 202 279.3, filed Mar. 7, 2022, the entire disclosure of which is hereby incorporated by reference in its entirety.

FIELD OF THE INVENTION

The present invention relates to an electrohydraulic control device for an adjustable hydraulic pump system and to an adjustable hydraulic pump system.

BACKGROUND OF THE INVENTION

An adjustable hydraulic pump system within the meaning of this application denotes a system with a hydraulic pump for delivering hydraulic fluid from a tank or reservoir to a fluid outlet of the adjustable hydraulic pump system, wherein a delivery rate of the adjustable hydraulic pump system provided at the fluid outlet is adjustable during operation. A higher-level hydraulic system with one or more hydraulic consumers and further hydraulic components, such as various valve devices, is regularly connected to this fluid outlet.

Adjustable hydraulic pump systems are generally known. They are regularly used to supply complex higher-level hydraulic systems for which the fluid flow provided at the fluid outlet of the adjustable hydraulic pump system is controlled in order to regulate one or more controlled variables to corresponding reference variables. The controlled variable can be, for example, an output pressure, an output volume flow, a hydraulic power, a maximum permissible output pressure or a combination of several controlled variables.

Such adjustable hydraulic pump systems differ fundamentally in the type of hydraulic pump used. Thus, such an adjustable hydraulic pump system can be operated either with a variable displacement pump or with a fixed displacement pump.

A variable displacement pump is a hydraulic pump that has a geometric displacement volume that can be changed during operation. This allows the fluid flow provided by the variable displacement pump at the fluid outlet of the variable displacement hydraulic pump system to be adjusted during operation. Classically, axial piston pumps or vane pumps are used as variable displacement pumps. Such variable displacement pumps comprise an control piston. The geometric displacement volume of the variable displacement pump can be changed during operation via the control piston.

A fixed displacement pump is a hydraulic pump that has a constant geometric displacement volume that cannot be changed during operation. An adjustable hydraulic pump system can also be implemented with a fixed displacement pump. For this purpose, the adjustable hydraulic pump system comprises a recirculation valve device. Via this recirculation valve device belonging to the adjustable hydraulic pump system, the fluid flow provided by the fixed displacement pump can be divided between the fluid outlet and a tank outlet or return. In other words, a fixed displacement pump provides a constant fluid flow, whereby a partial flow of the fluid flow can be fed directly back into the tank via the recirculation valve device. Thus, the fluid flow provided at the fluid outlet can be adjusted during operation.

Both the control piston of a variable displacement pump and the recirculation valve device used in conjunction with a fixed displacement pump represent control devices of the respective variable displacement hydraulic pump system. The fluid flow actually provided at the fluid outlet of the variable displacement hydraulic pump system can be controlled via these control devices.

Such adjustable hydraulic pump systems must always be considered in conjunction with the higher-level hydraulic system, which regularly makes control of the adjustable hydraulic pump system very complex in terms of control accuracy, dynamics or stability.

Currently, the control of the provided fluid flow of the adjustable hydraulic pump system is done by means of hydromechanical control devices. These hydromechanical control devices work with hydraulic parameters (for example, nozzles or spool cross-sections) and/or mechanical parameters (for example, spring rates or preload forces). However, these hydraulic and mechanical parameters cannot usually be changed at all during operation of the adjustable hydraulic pump system, and certainly not in an automated manner. In practice, this usually makes it difficult or impossible to subsequently adapt the control parameters to changed control targets or changed environmental conditions, such as temperature changes or wear phenomena. In addition, hydromechanical control devices of this type, such as those known from EP 2 682 610 A1, regularly require a large number of hydraulic components, which results in hydraulic losses that have to be compensated.

SUMMARY OF THE INVENTION

Against this background, it is an object of the present invention to provide a possibility of controlling an adjustable hydraulic pump system which, on the one hand, can be variably adjusted even during operation of the adjustable hydraulic pump system and, on the other hand, is subject to fewer hydraulic losses than previously known hydromechanical control devices.

The solution of this problem is achieved with an electrohydraulic control device and an adjustable hydraulic pump system according to the embodiments in this disclosure.

The electrohydraulic control device for an adjustable hydraulic pump system according to the invention comprises a valve device, an electronic control unit and at least a first fluid sensor. The valve device comprises a pressure inlet, a tank outlet and a first electromagnetically actuated valve. An output pressure of the adjustable hydraulic pump system is applied to the pressure inlet of the valve device. Thereby, the first fluid sensor detects the actual value of a fluid parameter of the adjustable hydraulic pump system and transmits the actual value of the fluid parameter to the electronic control unit. The electronic control unit includes computer-based modeling of the dynamics of the adjustable hydraulic pump system and actuates the first electromagnetically actuated valve based on the actual value of the fluid parameter and the computer-based modeling.

Computer-based modeling of the dynamics of the adjustable hydraulic pump system means a computer-based model of the dynamic behavior of the adjustable hydraulic pump system. In particular, the computer-based modeling incorporates measurement data and/or simulation data, such as CFD data, of the adjustable hydraulic pump system, which correlate parameters of the components of the electrohydraulic control device, such as a current flow of the first electromagnetically actuated valve, to state parameters of the adjustable hydraulic pump system, such as the fluid parameter detected by the first fluid sensor, for different operating points or operating states of the adjustable hydraulic pump system. In particular, the computer-based modeling takes into account the drive dynamics of a hydraulic pump of the adjustable hydraulic pump system to increase the control accuracy. In particular, the drive dynamics refer to an electric motor or the drive train of an internal combustion engine. In particular, the computer-based modeling also maps dependencies on a higher-level hydraulic system that is connected to the adjustable hydraulic pump system equipped with the electrohydraulic control device according to the invention in order to increase the control accuracy.

Based on this computer-based modeling, it is possible for the electronic control unit, in combination with the actual value of the fluid parameter transmitted by the first fluid sensor, to actuate the first electromagnetically actuated valve in such a way that a dynamic, individual, operating point-dependent adaptation of the adjustable hydraulic pump system to a wide variety of control targets can be made. Thus, on the software side, the computer-based modeling can also be subsequently adapted manually or automatically to changed control targets or environmental conditions, as required. In other words, by computer-based modeling of the dynamics of the adjustable hydraulic pump system, the electrohydraulic control device permits control of the adjustable hydraulic pump system that can be variably adapted during operation of the adjustable hydraulic pump system.

A fluid parameter is basically any parameter that describes the hydraulic fluid or the fluid flow, for example pressure, volume flow, viscosity, temperature or speed. A fluid sensor is basically any sensor that detects a fluid parameter.

The electrohydraulic control device according to the invention can thus be used to implement functionalities such as pressure control, pressure cut-off, power control, active vibration damping, operating point optimization with regard to efficiency, acoustics, temperature and other parameters of a hydraulic pump and its drive, condition monitoring of a hydraulic pump or predictive maintenance of a hydraulic pump.

In addition, the electrohydraulic control device according to the invention requires less hydraulic components, so that a reduction in hydraulic losses is achieved compared to known hydromechanical control devices.

Preferably, the fluid parameter is the output pressure or an output volume flow of the adjustable hydraulic pump system. In particular, the first fluid sensor is either a first pressure sensor, in particular a first electronic pressure sensor, or a first volume flow sensor. The output pressure and the output volume flow are present at the fluid outlet of the adjustable hydraulic pump system, i.e. at the interface to the higher-level hydraulic system. This ensures particularly accurate detection of the variables to be controlled.

Preferably, the computer-based modeling of the dynamics of the adjustable hydraulic pump system further comprises an artificial neural network. In particular, the artificial neural network is fed with training data. In particular, the training data comprises measurement data, simulation data, such as CFD data, and/or other data describing the dynamic behavior of the adjustable pump system. In particular, the artificial neural network comprises input parameters and at least one output parameter. In particular, the output pressure, the output volume flow, the flow of components of the valve device and/or other parameters of the adjustable hydraulic pump system and/or the higher-level hydraulic system are input parameters of the artificial neural network. In particular, the at least one output parameter is a prediction of the output pressure or a prediction of the output volume flow of the adjustable hydraulic pump system. In particular, the at least one output parameter is a command variable of the electronic control unit. In particular, the command variable of the electronic control unit is the flow rate of the components of the valve device. Thus, the electronic control unit implements an adaptive, robust control system that automatically adapts to changing operating points.

Preferably, the first electromagnetically actuated valve is a first proportional valve or a first switching valve. In particular, the first proportional valve is a 2/2 proportional directional valve, a 2/2 proportional seat valve, a 4/3 proportional directional valve, a 3/3 proportional directional valve, a 3/2 proportional directional valve or a proportional pressure relief valve. In particular, in the first proportional valve configured as a 4/3 proportional directional control valve, a consumer outlet is closed. In particular, the first switching valve is a 2/2 switching directional control valve or a 2/2 switching seat valve. As used herein, a switching valve is a black and white or binary valve that has only the "open" and "closed" positions. In particular, if the first electromagnetically actuated valve is the first switching valve, the electronic control actuates the first switching valve in the form of a digital hydraulic control, so that the first electromagnetically actuated valve has quasi-proportional dynamics. Two basic concepts are used for digital hydraulic control with quasi-proportional dynamics. First, the switching valve can be switched so quickly that a defined, floating state of a valve piston of the switching valve is achieved. Secondly, individual switching pulses can be used to achieve a volume flow defined by the switching duration and the pressure difference across the switching valve. The individual added switching volumes integrated over time result in the defined volume flow.

Preferably, the first fluid sensor is integrated in the first electromagnetically actuated valve. In this way, the use of so-called intelligent valve cartridges, which for example have an electronic pressure sensor directly integrated for connection to the electronic control unit, allows compact components to be installed and thus the first fluid sensor to be implemented efficiently and installation space to be used efficiently.

Preferably, the valve device further comprises a control outlet connected to an actuator of the adjustable hydraulic pump system, wherein a first hydraulic connection is formed between the pressure inlet and the control outlet, and a second hydraulic connection is formed between the control outlet and the tank outlet. Here, a hydraulic connection is referred to as a fluid-carrying connection in which components for temporarily interrupting fluid flow may also be disposed. The first hydraulic connection may also be referred to as the inlet of the valve device. The second hydraulic connection may also be referred to as the outlet of the valve device. Thus, via the first hydraulic connection, the outlet pressure applied to the pressure inlet is connected to the control outlet, so that via the outlet pressure of the adjustable hydraulic pump system, the actuating device of the adjustable hydraulic pump system is actuated.

Preferably, the valve device further comprises a second electromagnetically actuated valve, wherein the first electromagnetically actuated valve is disposed in the first hydraulic connection and the second electromagnetically actuated valve is disposed in the second hydraulic connection. Thereby, the electronic control unit actuates the second electromagnetically actuated valve based on the actual value of the fluid parameter and the computer-based modeling. The use of two valves in the inlet and outlet of the valve device is particularly advantageous for small flow rates of the adjustable hydraulic pump system. Thus, the second electromagnetically actuated valve to the tank can open only at small flow rates as needed and remain closed at higher flow rates to further reduce hydraulic losses.

Preferably, the second electromagnetically actuated valve is a second proportional valve or a second switching valve. In particular, the second proportional valve is a 2/2 proportional directional valve, a 2/2 proportional seat valve, or a proportional pressure relief valve. In particular, the second switching valve is a 2/2 switching directional valve or a 2/2 switching seat valve. In particular, when the second electromagnetically valve is the second switching valve, the electronic control actuates the second switching valve in the form of digital hydraulic actuation so that the second electromagnetically valve has quasi-proportional dynamics. In particular, the first electromagnetically actuated valve and the second electromagnetically actuated valve are disposed in a common housing of the valve device.

Preferably, the electrohydraulic control device further comprises at least one second fluid sensor, the second fluid sensor being integrated in the second electromagnetically actuated valve. In this way, the use of so-called intelligent valve cartridges, which for example have a pressure sensor directly integrated for connection to the electronic control unit, allows compact components to be installed and thus the second fluid sensor to be implemented efficiently and installation space to be used efficiently. By using a second fluid sensor on the second electromagnetically actuated valve, the electronic control unit can control the second electromagnetically actuated valve even more precisely.

Alternatively, the valve device further comprises a hydraulic resistor, wherein the first electromagnetically actuated valve is disposed in the first hydraulic connection and the hydraulic resistor is disposed in the second hydraulic connection. In particular, the hydraulic resistor is a fixed orifice or a fixed nozzle.

Alternatively, the valve device further comprises a hydraulic resistor, wherein the hydraulic resistor is disposed in the first hydraulic connection and the first electromagnetically actuated valve is disposed in the second hydraulic connection. In particular, the hydraulic resistor is a fixed orifice or a fixed nozzle.

Preferably, the electrohydraulic control device further comprises a positioning angle sensor. When used in hydraulic pump systems with a variable displacement pump, the current displacement angle of the variable displacement pump can be transmitted to the electronic control unit via the displacement angle sensor, which thus has additional information available, further increasing the control accuracy of the electrohydraulic control device.

Furthermore, the solution of the problem is achieved with an adjustable hydraulic pump system with an electrohydraulic control device according to the invention. Thus, it is possible to provide an adjustable hydraulic pump system whose control can be variably adjusted during operation of the adjustable hydraulic pump system and which has reduced hydraulic losses.

Preferably, the adjustable hydraulic pump system comprises a hydraulic pump and an actuating device. Preferably, the control outlet of the valve device of the electrohydraulic control device is connected to the actuating device of the hydraulic pump. Preferably, the hydraulic pump is a variable displacement pump and the actuating device is preferably an control piston of the variable displacement pump connected to the control outlet of the valve device of the electrohydraulic control device. Alternatively, the hydraulic pump is a fixed displacement pump and the actuating device is a recirculating valve device connected to the control outlet of the valve device of the electrohydraulic control device.

Alternatively, the adjustable hydraulic pump system comprises a fixed displacement pump and a recirculation valve device. In this case, the recirculating valve device of the adjustable hydraulic pump system is preferably the valve device of the electrohydraulic control device.

If the variable displacement hydraulic pump system comprises a variable displacement pump, a soft sensor volume flow determination is preferably implemented in the electronic control unit. For this purpose, the electronic control unit comprises a further artificial neural network which comprises training data and input parameters as described above. The at least one output parameter of the further artificial neural network is the position of the control piston of the variable displacement pump. Further, the first fluid sensor is a first pressure sensor that detects the output pressure. The delivery pistons of the variable displacement pump cause cyclic pulses in the measurement signal of the output pressure. Based on a frequency analysis, in particular a Fast Fourier Transform, of the measurement signal of the first pressure sensor, the speed of the variable displacement pump is thus determined. The electronic control unit calculates the current delivery rate of the variable displacement pump using the position of the control piston of the variable displacement pump and the speed of the variable displacement pump. This can be used, for example, as an additional parameter for control or output to a user.

Furthermore, it is conceivable that further external data is transmitted to the electronic control unit, which, for example, maps parameters of the higher-level hydraulic system. For example, it is conceivable that the higher-level hydraulic system comprises an articulated mast with several mast segments, and that the positioning angle between these mast segments is transmitted to the electronic control unit as a further input variable. Furthermore, ambient parameters can also be transmitted to the electronic control unit as input variables, for example the ambient temperature or the air pressure.

BRIEF DESCRIPTION OF THE DRAWINGS

The invention is explained in more detail below with reference to embodiments shown in the figures. Herein schematically

DETAILED DESCRIPTION OF THE INVENTION

Figure 1:
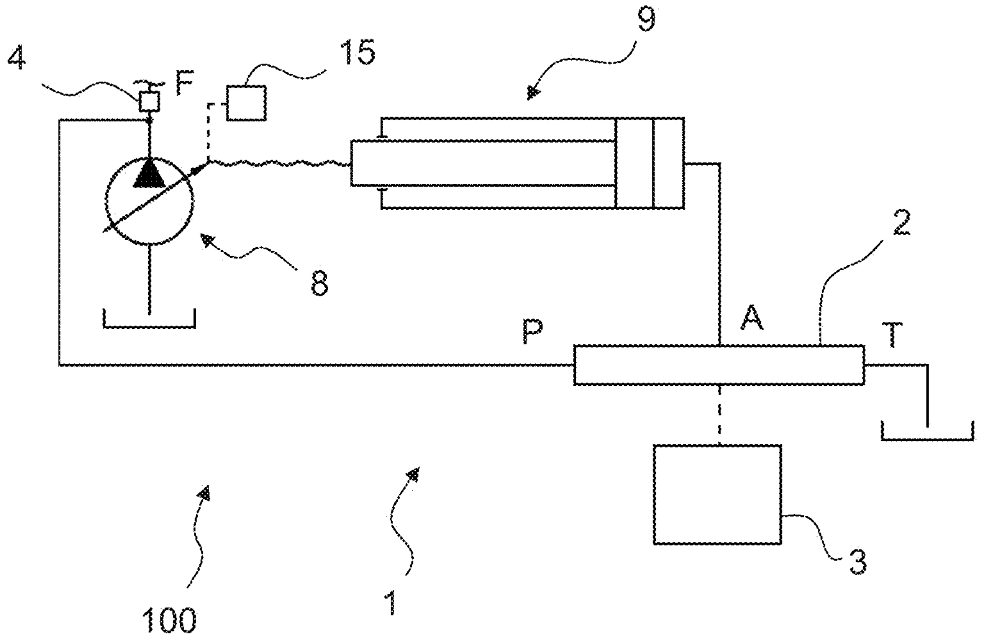
FIG. 1 is a circuit diagram of a first adjustable hydraulic pump system with an electrohydraulic control device according to the invention in accordance with a first embodiment.

FIG. 1 shows a schematic circuit diagram of a first adjustable hydraulic pump system 100 with an electrohydraulic control device 1 according to the invention in accordance with a first embodiment and a fluid outlet F to which a higher-level hydraulic system is connected (not shown).

The electrohydraulic control device 1 comprises a valve device 2, an electronic control unit 3 and a first fluid sensor 4. The valve device 2 comprises a pressure inlet P, a tank outlet T and a first electromagnetically actuated valve 5 (cf., for example, FIGS. 3*a* to 9*b*). An output pressure of the first adjustable hydraulic pump system 100 is applied to the pressure inlet P of the valve device. The first fluid sensor 4 detects the actual value of a fluid parameter of the first adjustable hydraulic pump system 100 and transmits the actual value of the fluid parameter to the electronic control unit 3 in a known manner, for example via a (not shown) signal line or via a wireless connection. Thereby, the electronic control unit 3 comprises a computer-based modeling of the dynamics of the first adjustable hydraulic pump system 100 and actuates the first electromagnetically actuated valve 5 based on the actual value of the fluid parameter and the computer-based modeling.

In the present embodiment, the fluid parameter sensed by the first fluid sensor 4 is the output pressure of the first adjustable hydraulic pump system 100. Thus, the first fluid sensor 4 is a first electronic pressure sensor. However, the first fluid sensor 4 may also sense an output volume flow of the first adjustable hydraulic pump system 100. In this case, the first fluid sensor 4 is a first volume flow sensor. It is also conceivable that the first fluid sensor 4 is a combined pressure and volume flow sensor.

The computer-based modeling of the dynamics of the first adjustable hydraulic pump system 100 includes an artificial neural network.

FIGS. 3*a* to 8 show different variants of the valve device 2 according to the first embodiment of the electrohydraulic control device 1, in which corresponding variants of the first electromagnetically actuated valve 5 can be seen.

Figure 3A:
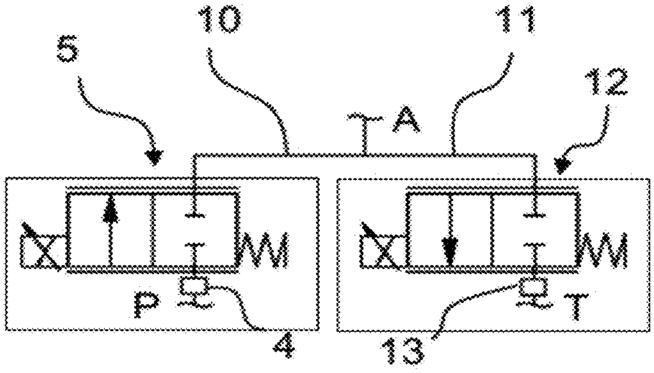
FIG. 3*a* is a first variant of a valve device of the electrohydraulic control device according to the first and second embodiments.
Figure 3B:
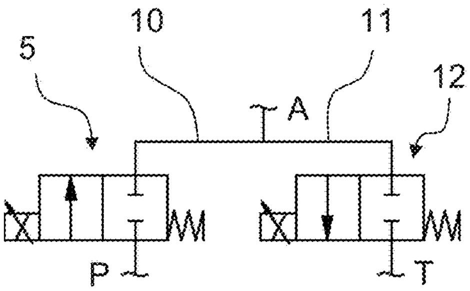
FIG. 3*b* is a second variant of the valve device of the electrohydraulic control device according to the first and second embodiments.
Figure 4A:
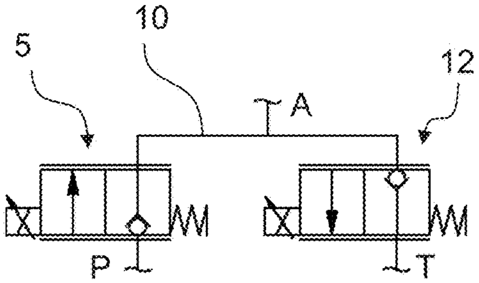
FIG. 4*a* is a third variant of the valve device of the electrohydraulic control device according to the first and second embodiments.
Figure 4B:
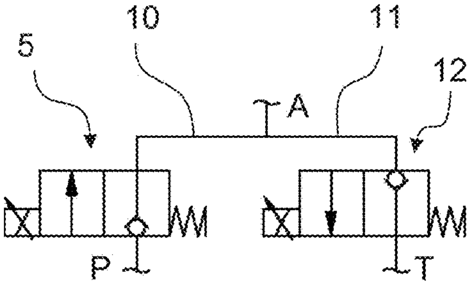
FIG. 4*b* is a fourth variant of the valve device of the electrohydraulic control device according to the first and second embodiments.
Figure 5A:
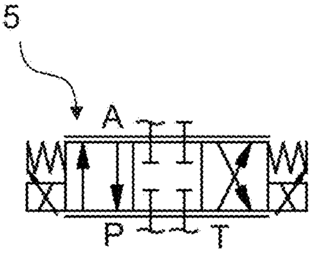
FIG. 5*a* is a fifth variant of the valve device of the electrohydraulic control device according to the first and second embodiments.
Figure 5B:
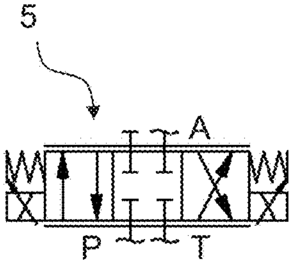
FIG. 5*b* is a sixth variant of the valve device of the electrohydraulic control device according to the first and second embodiments.
Figure 6:
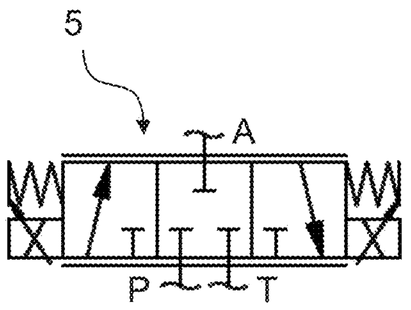
FIG. 6 is a seventh variant of the valve device of the electrohydraulic control device according to the first and second embodiments.
Figure 7:
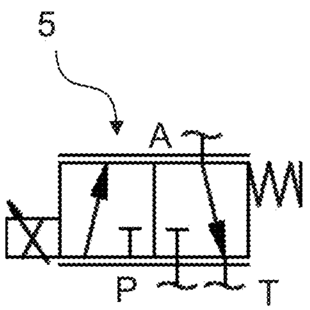
FIG. 7 is an eighth variant of the valve device of the electrohydraulic control device according to the first and second embodiments.
Figure 8:
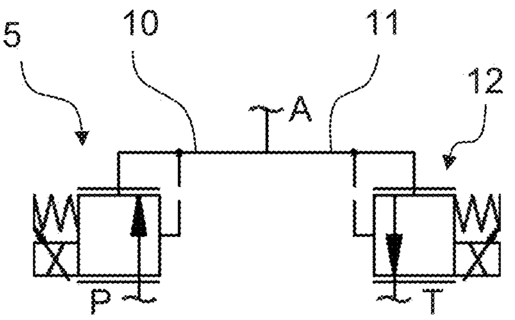
FIG. 8 is a ninth variant of the valve device of the electrohydraulic control device according to the first and second embodiments.

According to the first variant of the valve device 2, the first electromagnetically actuated valve 5 is a 2/2 proportional directional control valve (cf. FIG. 3*a*). According to the second variant of the valve device 2, the first electromagnetically actuated valve 5 is a 2/2 switching directional control valve (cf. FIG. 3*b*). According to the third variant of the valve device 2, the first electromagnetically actuated valve 5 is a 2/2 proportional seat valve (cf. FIG. 4*a*). According to the fourth variant of the valve device 2, the first electromagnetically actuated valve 5 is a 2/2 switching seat valve (cf. FIG. 4*b*). According to the fifth and sixth variants of the valve device 2, the first electromagnetically actuated valve 5 is a 4/3 proportional seat valve in which one port is blocked in each case (cf. FIGS. 5*a* and 5*b*). According to the seventh variant of the valve device 2, the first electromagnetically actuated valve 5 is a 3/3 proportional directional control valve (cf. FIG. 6). According to the eighth variant of the valve device 2, the first electromagnetically actuated valve 5 is a 3/2 proportional directional control valve (cf. FIG. 7). According to the ninth variant of the valve device 2, the first electromagnetically actuated valve 5 is a proportional pressure relief valve (cf. FIG. 8). The first electromagnetically actuated valve 5 is also biased by a spring force in each variant, as can be seen in the figures.

As shown schematically by way of example in FIG. 3*a* for the 2/2 proportional directional control valve, the first fluid sensor 4 can also be integrated in the first electromagnetically actuated valve 5. It is obvious to the person skilled in the art that the first fluid sensor 4 can also be integrated in the first electromagnetically actuated valve 5 in all further variants of the first electromagnetically actuated valve 5 shown in the figures.

As shown in FIG. 1, the valve device 2 of the electrohydraulic control device 1 according to the first embodiment further comprises a control outlet A. The control outlet A is connected to an actuator of the first hydraulic pump system 100. The first adjustable hydraulic pump system 100 comprises an adjustable pump 8 with an control piston 9. The control piston 9 is the actuator of the first adjustable hydraulic pump system 100 (cf. FIG. 1).

As can be seen in FIGS. 3*a* to 9*b*, in the valve device 2 of the first embodiment of the electrohydraulic control device 1, a first hydraulic connection 10 is formed between the pressure inlet P and the control outlet A. In addition, a second hydraulic connection 11 is formed between the control outlet A and the tank outlet T. The first hydraulic connection 10 is here an inlet of the valve device 2 and the second hydraulic connection 11 is here an outlet of the valve device 2.

As shown in FIGS. 3*a*, 3*b*, 4*a*, 4*b*, and 8, the valve device 2 according to the variants shown in these figures further comprises a second electromagnetically actuated valve 12, wherein the first electromagnetically actuated valve 5 is disposed in the first hydraulic connection 10 and the second electromagnetically actuated valve 12 is disposed in the second hydraulic connection 11.

According to the first variant of the valve device 2, the second electromagnetically actuated valve 12 is a 2/2 proportional directional control valve (cf. FIG. 3*a*). According to the second variant of the valve device 2, the second electromagnetically actuated valve 12 is a 2/2 switching directional control valve (cf. FIG. 3*b*). According to the third variant of the valve device 2, the second electromagnetically actuated valve 12 is a 2/2 proportional seat valve (cf. FIG. 4*a*). According to the fourth variant of the valve device 2, the second electromagnetically actuated valve 12 is a 2/2 switching seat valve (cf. FIG. 4*b*). According to the ninth variant of the valve device 2, the second electromagnetically actuated valve 12 is a proportional pressure relief valve (cf. FIG. 8). The second electromagnetically actuated valve 12 is also biased by a spring force in each variant, as can be seen in the figures.

As shown schematically by way of example in FIG. 3*a* for the 2/2 proportional directional control valve, the electrohydraulic control device 1 can further comprise a second fluid sensor 13 which is integrated in the second electromagnetically actuated valve 12. In this regard, it is obvious to the person skilled in the art that also in all further variants of the second electromagnetically actuated valve 12 shown in the figures, the second fluid sensor 13 may be integrated in the second electromagnetically actuated valve 12. In the present case, the second fluid sensor 13 is a pressure sensor to the tank.

The artificial neural network of the electronic control unit 3 is fed with training data such as the output pressure of the first adjustable hydraulic pump system 100, a pressure at the control piston 9, and a energization of the first electromagnetically actuated valve 5. If the valve device 2 comprises the second electromagnetically actuated valve 12, the training data also includes an energization of the second electromagnetically actuated valve 12. The artificial neural network of the electronic control unit 3 processes the measurement signals of the first fluid sensor 4 and, if applicable, the second fluid sensor 13 in combination with its training data to calculate a prediction of the output pressure of the first adjustable hydraulic pump system 100. Thus, the electronic control unit 3 implements an adaptive, robust control for the adjustable hydraulic pump system 100.

The electrohydraulic control device 1 according to the invention is thus configured, for example, to control the output pressure of the first adjustable pump system 100 applied to the fluid outlet F (cf. FIG. 1). The output pressure is thus to be adjusted to a reference variable. In this context, the valve device 2 comprises, for example, as shown in FIG. 3*a*, a first electromagnetically actuated 2/2 proportional directional control valve 5 with integrated first fluid sensor 4 and a second electromagnetically actuated 2/2 proportional directional control valve 12 with integrated second fluid sensor 13. The electronic control unit 3 thus receives the sensor data from at least the first fluid sensor 4, which detects the actual value of the output pressure, and the second fluid sensor 13, which detects the actual value of the pressure in the direction of the tank. In addition, the electronic control unit 3 can, for example, receive sensor data from a positioning angle sensor 15 of the variable displacement pump 8 or other sensors present in the higher-level hydraulic system.

In combination with the computer-based modeling of the dynamics of the first adjustable hydraulic pump system 100, the electronic control unit 3 processes the sensor data obtained to actuate the valve device 2. The actual value of the output pressure is compared with the reference variable to be controlled and a currently present control error is calculated. Based on this control error, the electronic control unit 3 calculates the control variables required to provide the required command variable.

Specifically, the electronic control unit 3 calculates as control variables the current flow of the first electromagnetically actuated 2/2 proportional directional control valve 5 and the current flow of the second electromagnetically actuated 2/2 proportional directional control valve 12, which is necessary to control the desired outlet pressure at the fluid outlet F. The command variables here are therefore the switching states of the two valves. Via the respective energization, the first electromagnetically actuated 2/2 proportional directional control valve 5 and the second electromagnetically actuated 2/2 proportional directional control valve 12 are switched in such a way that the pressure applied to the control outlet A moves the control piston 9 of the variable displacement pump 8 in such a way that the variable displacement pump 8 supplies the geometric displacement volume required to set the desired output pressure at the fluid output F. The output pressure at the fluid output F is set to the desired value. The output pressure at fluid outlet F is used to actuate the variable displacement piston 9 via control outlet A by means of pressure inlet P. The second electromagnetically actuated 2/2 proportional directional control valve 12 is thereby regularly opened by the electronic control unit 3 only for small flow rates of the variable displacement pump 8 to the tank outlet T and not for larger flow rates in order to control the hydraulic losses to a minimum. However, the electronic control unit 3 always gives priority to controlling the control error to a minimum before controlling the hydraulic losses.

Figure 9A:
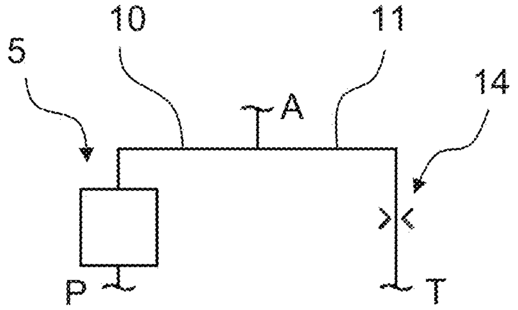
FIG. 9*a* is a tenth variant of the valve device of the electrohydraulic control device according to the first and second embodiments.
Figure 9B:
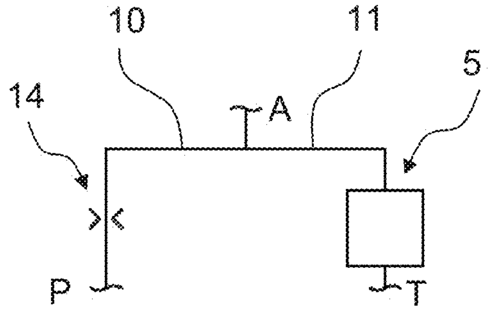
FIG. 9*b* is an eleventh variant of the valve device of the electrohydraulic control device according to the first and second embodiments.

As shown schematically in FIGS. 9*a* and 9*b*, in a tenth and eleventh variant the valve device 2 comprises a hydraulic resistor 14. The hydraulic resistor 14 may be a fixed throttle or a fixed nozzle. However, it is also conceivable to use an adjustable hydraulic resistor, i.e. an adjustable throttle or nozzle.

According to the tenth variant of the valve device 2, the first electromagnetically actuated valve 5 is disposed in the first hydraulic connection 10 and the hydraulic resistor is disposed in the second hydraulic connection (cf. FIG. 9*a*). According to the eleventh variant of the valve device 2, the hydraulic resistor 14 is disposed in the first hydraulic connection 10 and the first electromagnetically actuated valve 5 is disposed in the second hydraulic connection 11 (cf. FIG. 9*b*).

As can be further seen in FIG. 1, the electrohydraulic control device 1 according to the first embodiment further comprises a positioning angle sensor 15. The positioning angle sensor 15 detects the positioning angle of the variable displacement pump 8, which is set by the control piston 9, and transmits this to the electronic control unit 3.

The transmission of signals to the electronic control unit 3 by the first fluid sensor 4, the second fluid sensor 13 and the actuating angle sensor 15 is carried out in a generally known manner either wired or wireless.

Figure 2:
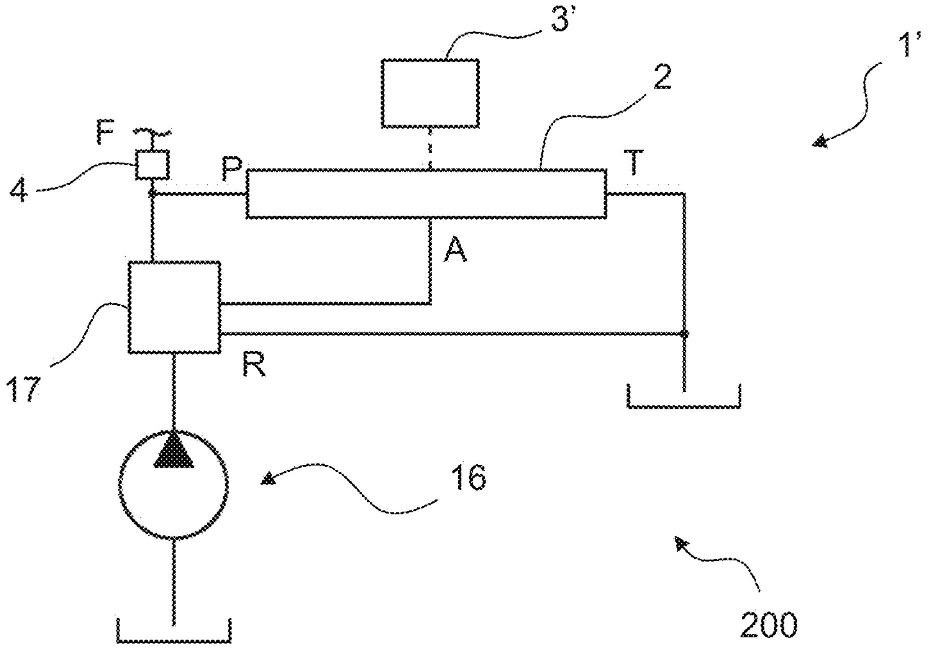
FIG. 2 is a circuit diagram of a second adjustable hydraulic pump system with an electrohydraulic control device according to the invention in accordance with a second embodiment.

With reference to FIG. 2, an electrohydraulic control device 1' according to the invention will now be described in accordance with a second embodiment. The electrohydraulic control device 1' according to the second embodiment differs from the electrohydraulic control device 1 according to the first embodiment only in the features described below. Consequently, the above description of the remaining features of the electrohydraulic control device 1 according to the first embodiment refers in an identical manner to the electrohydraulic control device 1' according to the second embodiment.

FIG. 2 shows a second adjustable hydraulic pump system 200 comprising a fixed displacement pump 16, a first recirculating valve device 17 and the electrohydraulic control device 1' according to the second embodiment.

The electrohydraulic control device 1' according to the second embodiment comprises the valve device 2, an electronic control unit 3' and the first fluid sensor 4. The valve device 2 comprises the pressure inlet P, the tank outlet T and the first electromagnetically actuated valve 5. The pressure inlet P of the valve device 2 is pressurized with an output pressure of the second adjustable hydraulic pump system 200. The first fluid sensor 4 detects the actual value of a fluid parameter of the second adjustable hydraulic pump system 200, and transmits the actual value of the fluid parameter to an electronic control unit 3'. The electronic control unit 3' includes computer-based modeling of the dynamics of the second adjustable hydraulic pump system 200, and actuates the first electromagnetically actuated valve 5 based on the actual value of the fluid parameter and the computer-based modeling.

The control outlet A of the valve device 2 is connected to the first recirculation valve device 17, so that the valve device 2 actuates the first recirculation valve device 17. Through the first recirculation device 17, the fluid flow supplied by the fixed displacement pump 16 is divided as required between the fluid outlet F and a return R of the first recirculation valve device 17.

The artificial neural network of the electronic control unit 3' is fed with training data such as the output pressure of the second adjustable hydraulic pump system 200 and a current flow of the first electromagnetically actuated valve 5 in a similar manner to the artificial neural network of the electronic control unit 3. If the valve device 2 comprises the second electromagnetically actuated valve 12, the training data also includes an energization of the second electromagnetically actuated valve 12. The artificial neural network of the electronic control unit 3' processes the measurement signals of the first fluid sensor 4 and, if applicable, the second fluid sensor 13 in combination with its training data to calculate a prediction of the output pressure of the second adjustable hydraulic pump system 200. Thus, the electronic control unit 3' implements an adaptive, robust control for the second adjustable hydraulic pump system 200.

In contrast to the electrohydraulic control device 1 according to the first embodiment, the electrohydraulic control device 1' according to the second embodiment does not comprise the actuating angle sensor 15.

Figure 10A:
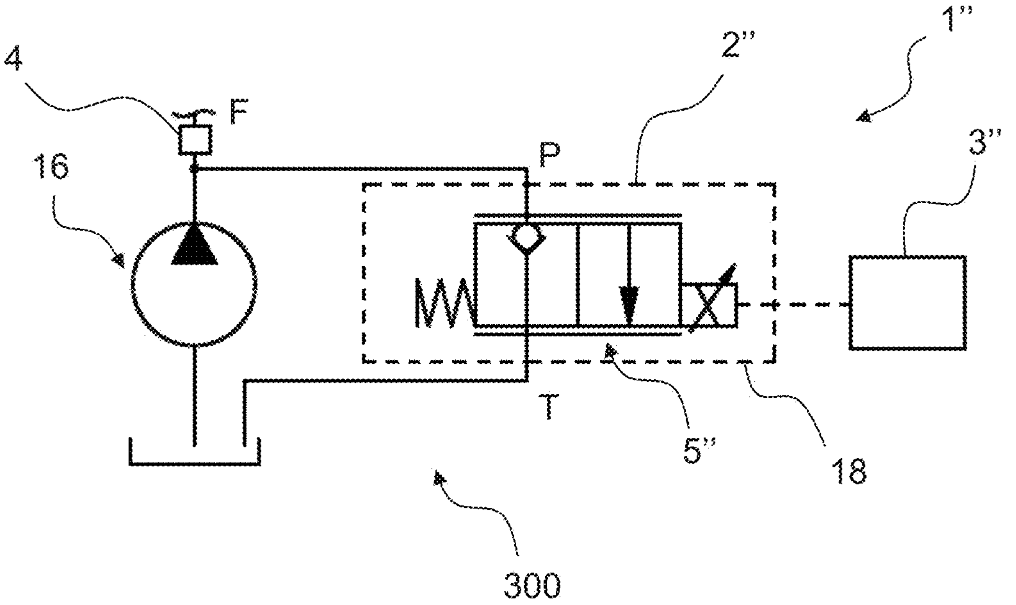
FIG. 10*a* is a circuit diagram of a third adjustable hydraulic pump system with an electrohydraulic control device according to a third embodiment with a first variant of a valve device.
Figure 10B:
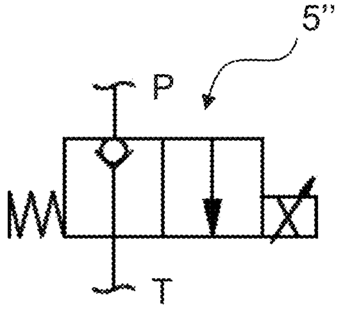
FIG. 10*b* is a second variant of the valve device of the electrohydraulic control device according to the third embodiment.

With reference to FIGS. 10*a* and 10*b*, an electrohydraulic control device 1" according to a third embodiment is now described. FIG. 10*a* shows a third adjustable hydraulic pump system 300 comprising the fixed displacement pump 16 and the electrohydraulic control device 1" according to the third embodiment.

The electrohydraulic control device 1" according to the third embodiment comprises a valve device 2", an electronic control unit 3" and the first fluid sensor 4. The valve device 2" comprises the pressure inlet P, the tank outlet T and a first electromagnetically actuated valve 5". The pressure inlet P of the valve device 2" is pressurized with an output pressure of the third adjustable hydraulic pump system 300. The first fluid sensor 4 detects the actual value of a fluid parameter of the third adjustable hydraulic pump system 300 and transmits the actual value of the fluid parameter to an electronic control unit 3". The electronic control unit 3" includes computer-based modeling of the dynamics of the third adjustable hydraulic pump system 300, and actuates the first electromagnetically actuated valve 5" based on the actual value of the fluid parameter and the computer-based modeling.

The third adjustable hydraulic pump system 300 further comprises a second recirculating valve device 18. As shown in FIG. 10*a*, the second recirculating valve device 18 is the valve device 2" of the electrohydraulic control device 1" according to the third embodiment.

The first electromagnetically actuated valve 5" is a 2/2 proportional seat valve (see FIG. 10*a*). As shown in FIG. 10*b*, the first electromagnetically actuated valve 5" is alternatively a 2/2 switching seat valve, which is correspondingly actuated by the electronic control 3" in the form of a digital hydraulic control, so that the first electromagnetically actuated valve 5" has quasi-proportional dynamics. It is obvious to the skilled person that the first electromagnetically actuated valve 5" can also be a proportional or switching directional control valve, such as the first electromagnetically actuated valve 5 shown in FIGS. 3*a* and 3*b*.

REFERENCE LIST

1, 1', 1" electrohydraulic control device
2, 2" valve device
3, 3', 3" electronic control unit
4 first fluid sensor
5, 5" first electromagnetically actuated valve
8 variable displacement pump
9 control piston
10 first hydraulic connection/inlet
11 second hydraulic connection/outlet
12 second electromagnetically actuated valve
13 second fluid sensor
14 hydraulic resistor
15 position angle sensor
16 constant displacement pump
17 first recirculation valve device
18 second recirculation valve device
100 first adjustable hydraulic pump system
200 second adjustable hydraulic pump system
300 third adjustable hydraulic pump system
A control output
P pressure inlet
R return
T tank outlet
F fluid outlet

The invention claimed is:

1. An electrohydraulic control device for an adjustable hydraulic pump system, comprising:
a valve device;
an electronic control unit; and
at least one first fluid sensor,
wherein the valve device comprises a pressure inlet, a tank outlet and a first electromagnetically actuated valve, and an outlet pressure of the adjustable hydraulic pump system is applied to the pressure inlet of the valve device,
wherein the first fluid sensor detects an actual value of a fluid parameter of the adjustable hydraulic pump system and transmits the actual value of the fluid parameter to the electronic control unit,
wherein the electronic control unit comprises a computer-based modeling of an overall dynamic of the adjustable hydraulic pump system,
wherein the computer-based modeling of the overall dynamic of the adjustable hydraulic pump system comprises an artificial neural network which is fed with training data comprising measurement data and/or simulation data, wherein the artificial neural network comprises at least one output parameter, wherein the at least one output parameter is a predicted outlet pressure or a predicted outlet volume flow of the adjustable hydraulic pump system, and wherein the electronic control unit actuates the first electromagnetically actuated valve based on the actual value of the fluid parameter and based on the at least one output parameter of the artificial neural network.

2. The electrohydraulic control device according to claim 1, wherein the fluid parameter is the outlet pressure or an outlet volume flow of the adjustable hydraulic pump system.

3. The electrohydraulic control device according to claim 1, wherein the first electromagnetically actuated valve is a first proportional valve or a first switching valve.

4. The electrohydraulic control device according to claim 1, wherein the first fluid sensor is integrated in the first electromagnetically actuated valve.

5. The electrohydraulic control device according to claim 1, wherein the valve device further comprises a control outlet connected to an actuator of the adjustable hydraulic pump system, wherein a first hydraulic connection is formed between the pressure inlet and the control outlet, and a second hydraulic connection is formed between the control outlet and the tank outlet.

6. The electrohydraulic control device according to claim 5, wherein the valve device further comprises a hydraulic resistor, wherein the first electromagnetically actuated valve is disposed in the first hydraulic connection and the hydraulic resistor is disposed in the second hydraulic connection.

7. The electrohydraulic control device according to claim 5, wherein the valve device further comprises a hydraulic resistor, wherein the hydraulic resistor is disposed in the first hydraulic connection and the first electromagnetically actuated valve is disposed in the second hydraulic connection.

8. The electrohydraulic control device according to claim 5, wherein the electrohydraulic control device further comprises an actuating angle sensor.

9. The electrohydraulic control device according to claim 1, wherein the computer-based modeling comprises drive dynamics of a hydraulic pump of the adjustable hydraulic pump system.

10. An adjustable hydraulic pump system comprising an electrohydraulic control device according to claim 1.

11. The adjustable hydraulic pump system according to claim 10, wherein the adjustable hydraulic pump system comprises an adjustable pump with a control piston and a soft sensor volume flow determination is implemented in the electronic control unit.

* * * * *